Figure 3:
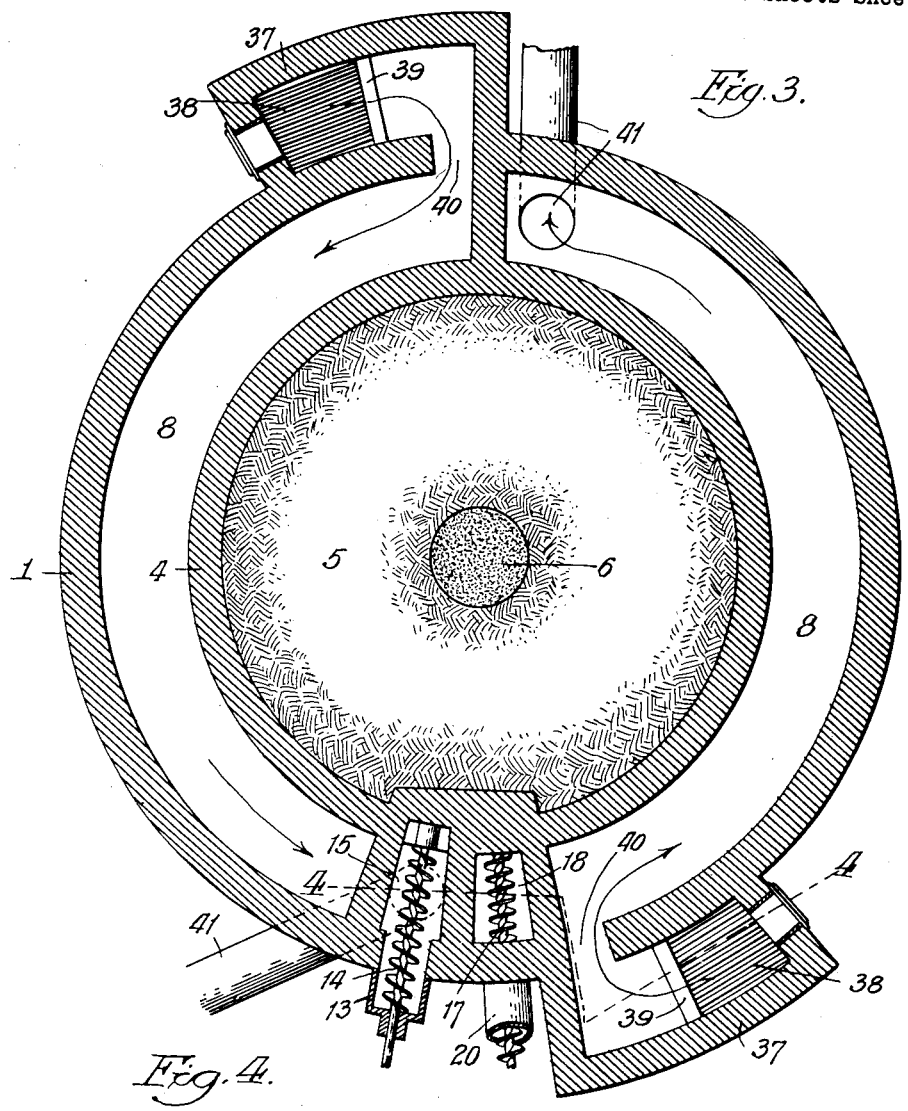

Sept. 25, 1928.
H. G. LYKKEN
1,685,496
LOW TEMPERATURE DISTILLATION APPARATUS
Filed May 23, 1924    2 Sheets-Sheet 1
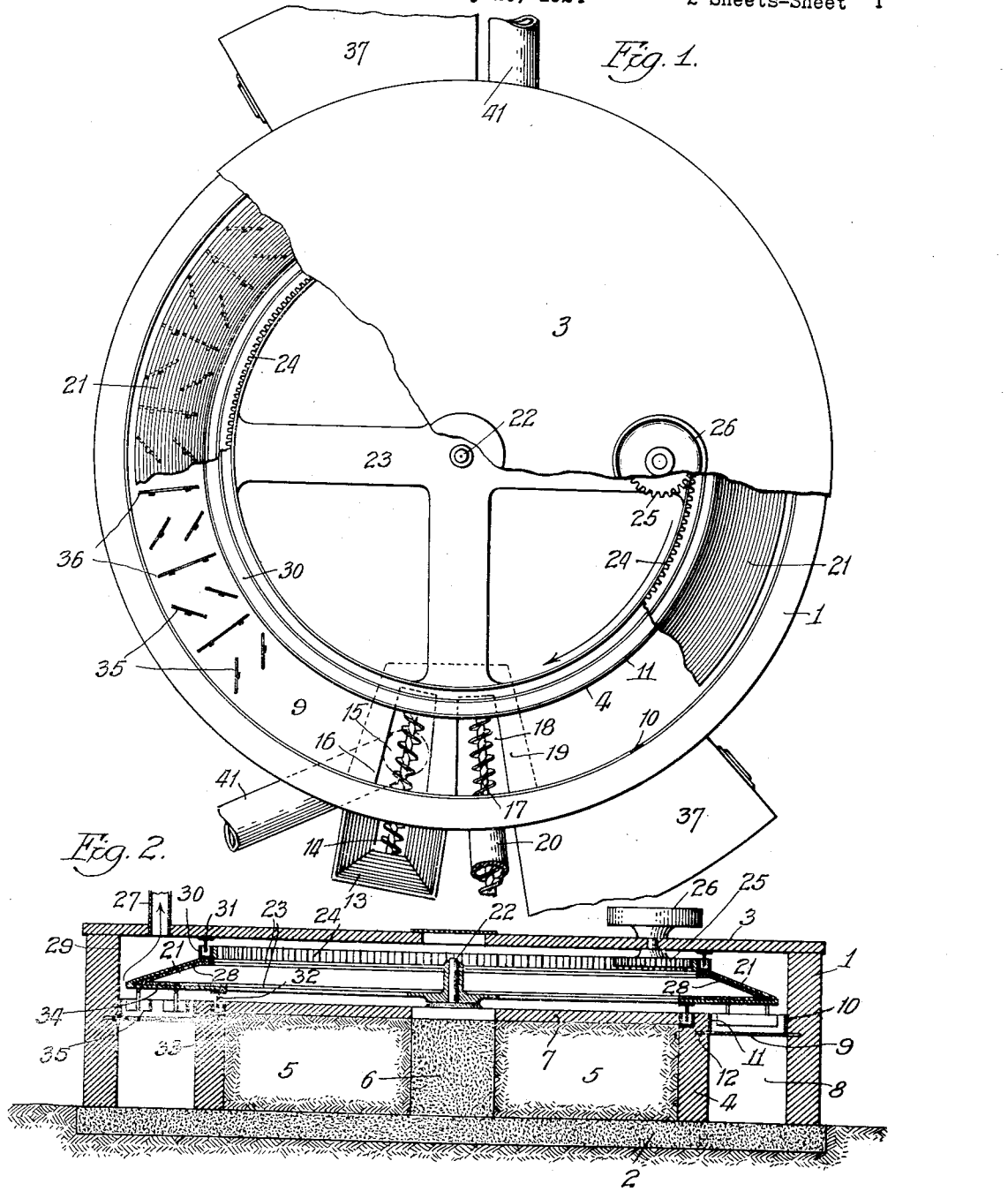
Inventor:
Henry G. Lykken,
by Wallace R. Lane
Atty.

Sept. 25, 1928.

H. G. LYKKEN 1,685,496

LOW TEMPERATURE DISTILLATION APPARATUS

Filed May 23, 1924 2 Sheets-Sheet 2

Inventor:
Henry G. Lykken,
by Wallace R. Lane.
Atty.

Patented Sept. 25, 1928.

1,685,496

UNITED STATES PATENT OFFICE.

HENRY G. LYKKEN, OF MINNEAPOLIS, MINNESOTA.

LOW-TEMPERATURE DISTILLATION APPARATUS.

Application filed May 23, 1924. Serial No. 715,324.

The present invention relates to low temperature distillation apparatus or kilns.

Among the objects of the invention are to provide a novel means for low temperature distillation of materials containing volatile matter, such as coal, wood, oil shales and other like and similar substances; to provide means whereby the distillation products may be withdrawn as soon as liberated to avoid the over-heating of the products or fractionation; to provide means for constantly stirring the materials undergoing distillation so that they shall be more or less thoroughly heated; to provide means for continuously charging and discharging the apparatus or kiln whereby the process of distillation may be continuous; to provide such means with one or more heating devices whereby the heat may be applied to the material in progressive or increasing amounts in the direction opposite to the progress of the material through the apparatus; to provide for an arcuate or annular pan or hearth for holding the material to be heated and means, preferably rotary, for stirring or turning the material and advancing the material over and along the pan, preferably from one end thereof to the other end, the pan preferably having a charging end and a discharging end for the material whereby the material may pass over the pan continuously; to provide a means over the pan, preferably in the form of a hood, which extends over the pan so as to facilitate the heating of the material thereon and for confining of the heat to a small space; to so locate the hood whereby it may extend over the pan for permitting the escaping of liberated products of distillation, such as the gases, to pass into a relatively cooler portion of the chamber, preferably above the hood, to safe-guard against fractionation; to provide means for the rapid removal of the products of distillation from the distillation chamber; to provide means for rotatably supporting the hood and for rotating the hood; to provide means for sealing the distillation chamber or channel from the other portions of the apparatus or kiln and the outside atmosphere whereby the products of distillation will not escape; to provide a cover or hood which is capable of revolving and which will have means, such as scrapers or similar members for continuously acting upon and turning the material upon the pan as well as advancing the same progressively from the charging or starting point to the outlet or discharge of the pan; and to provide such other and further objects, advantages and capabilities as will later appear and are inherently possessed by the invention.

Figure 4:
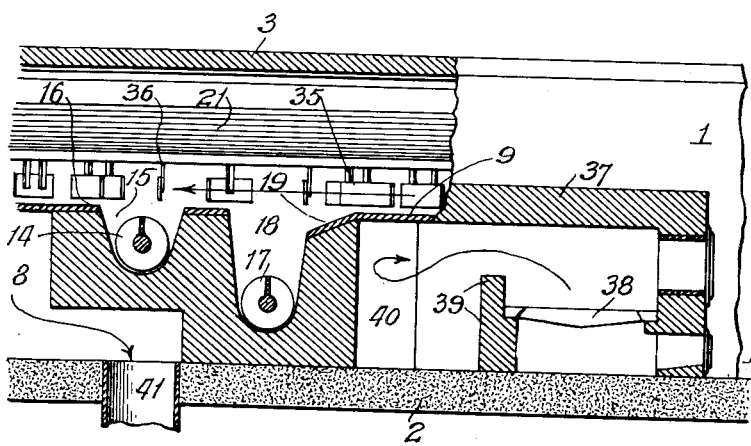

Referring to the drawings illustrating a preferred embodiment of the invention, Fig. 1 is a top plan view, with part broken away, of a kiln constructed in accordance with the invention; Fig. 2 is a transverse sectional view through the same; Fig. 3 is a horizontal sectional view through the lower part of the kiln; and, Fig. 4 is a fragmentary sectional view taken on the line 4—4 of Fig. 3.

Referring now more particularly to the drawings showing a kiln constructed in accordance with the invention, the apparatus is shown as comprising a substantially circular kiln having an outer wall 1, a base or foundation 2 and a roof or flooring 3 as well as an inner substantially circular wall 4 of less height than the wall 1. Withing the wall 4 is a fill 5 of any material, such as earth, and a central post 6. Upon the post 6, the fill 5 and the wall 4 may be located a flooring 7 or the like.

Over the annular space 8 formed between the walls 1 and 2 is suitably supported a pan or hearth 9 constructed of any suitable material, such as cast iron, steel, copper or the like as desired. This pan is of preferably channel shape having the flanges 10 and 11 thereof bearing against the side walls 1 and 4 and, if desired, with laterally extending lugs 12 extending in suitable recesses in the side walls 1 and 4 or, if desired, the pan may rest simply upon cross bars having their ends 12 extending in the recesses mentioned. This pan or hearth forms an annular channel shaped treating chamber or hearth for the action of the heat upon and into the material connected in said channel. The pan is substantially circular in cross section but is formed with ends at a point where material may be charged upon and discharged from the ends of the pan as shown clearly in Fig. 3 of the drawings.

At the charging point is provided a hopper 13 in which the material may be charged and in which a rotatable screw 14 is located to feed the material from the hopper into the space 15 at the charging end 16 of the pan. See Fig. 4 of the drawings.

As this screw operates the material will be piled up into position to be carried to the pan, as will be later more fully described. At the discharge end of the pan and located in staggered relation to the hopper 13 and screw 14 and also adjacent thereto is provided a second screw 17 operated in a space 18 in which the material may be discharged from the discharge end 19 of the pan and from which the material may be conveyed by the screw through a discharge conduit 20.

Above the pan, as well as above the post 6 and flooring 7 is rotatably mounted a cover or hood 21 upon a spindle or pivot 22 rigidly secured in the post 6 in any suitable manner. This cover is preferably formed with a plurality of radial arms 23 and carries at the upper part thereof a circular rack 24 for engagement therewith of a driving gear 25 rotatably mounted in the top or roof 3 and carrying a pulley 26 which may be driven in any suitable manner, as by a belt. The periphery of the cover or hood 21 extends over the pan 9 and into the space between the pan and the roof 3 where the products of distillation are liberated and carried away through a conduit 27 to a point of use, the conduit 27 being connected at a suitable point or points in the roof 3. The cover or hood 21 is preferably of metal and may be internally covered with suitable insulating material 28 as desired.

In order to prevent leakage or loss of the products of distillation from the chamber 29, above the pan, the hood is provided with seals comprising a trough 30 in which extends an apron 31 secured to the roof 3 and on the lower side of the hood is provided an apron 32 extending into a trough 33 located in the upper part of the wall 4. These troughs are designed to contain a sealing material or liquid which will not be affected by the heat but will prevent the passage of gases and the like from the chamber 29 into the apparatus or to the atmosphere.

It will be noted that the hood 21 extending into the chamber 29 divides it into an upper and lower chamber such that the space beneath the same, above the pan, constitutes the heating space or area for the material in the pan and the space above the hood constitutes a cooling space for the products of distillation before they are conducted off through the conduit 27. The lower surface 34 of the hood acts as a reflecting surface for the heat and helps in confining the heat in a small space above the pan.

For the purpose of obtaining a thorough heating of the materials on the pan and for the progress of this material from the charging end of the pan to the discharging end thereof the hood is provided with a plurality of depending scrapers 35 and 36 arranged in different angular relations as clearly shown in Fig. 1 of the drawings. These scrapers extend downwardly within a given distance of the upper surface of the bottom of the pan so that as the hood and the scrapers are rotated they will roll or turn the material over thus stirring it to permit a free and efficient liberation of the products of combustion from the material and at the same time the scrapers will gradually advance or cause a progression of the material along the surface of the pan from one end thereof to the other end thereof as the materials are being heated.

Beneath the pan is provided one or more chambers 8 acting as flues for the passage of heated material, such as the products of combustion from furnaces or heaters 37 as clearly shown in Figs. 1 and 3 of the drawings. Each furnace may have a grate 38 for supporting the combustible material from which the hot products of combustion are obtained and the latter are caused to pass over a fire wall 39, then through a port 40 and into the chamber or flue 8 and then passing out through a stack conduit 41, in the direction of the arrows shown in Fig. 3 of the drawings. While the specific embodiment shown upon the drawings shows two of these furnaces and a travel of the hot gases beneath the pan for substantially a half circle, it is to be understood however that only one furnace can be used if desired and the gases caused to pass completely around the kiln under the pan from the furnace to the stack 41.

In operation, the heated gases pass beneath the pan to heat the same in a direction opposite to the direction of movement of the material on the pan. At the same time the screw 14 operates to force the material upwardly into the path of the scrapers which feed the material upon the charging end of the pan. Continued movement of the scrapers causes a progression of the material from this end of the pan, along the same to the discharge end of the pan where the exhausted material is discharged over the end 19 into the space 18 where the screw 17 acts to withdraw the material to the exterior of the kiln. During this operation the gear 25 is operated to turn the hood 21 by way of the rack 24 at a given rate of speed.

As the gases or other products of distillation are given off from the material on the pan the same will flow upwardly around the periphery of the hood into the cooling space 29 where they will have an opportunity to be cooled before being drawn off through the conduit 27. By covering the periphery of the hood with insulated material the liberated gases are protected in the cooling space 29 from further action or fractionation.

From the above it is apparent that the operation of the kiln may be continuous without the necessity of stopping between heats and that the heating of the materials will be thorough and uniform and also gradual, the heat first being at the lowest temperature and gradually increasing as the materials are moved toward the inlet end of the hot gases beneath the pan from the heating furnace. The temperatures can be regulated so as to apply different temperatures at different or various portions of the pan as desired. In the case of using two furnaces as in the specific construction shown, the heat of one furnace may be quite different from the other furnace depending upon the particular amount of heat to be applied to the material. Ordinarily in low temperature distillations the temperature is usually below 800 degrees Fahrenheit. When this method is used in distilling oil shales the yields of the products of distillation are particularly greater and more valuable in hydrocarbons such as ethylene, ethane, buthane and similar distillation products. If such distillation were to be carried out at a higher temperature the latter would have a tendency to break up the products of combustion with the formation of heavier hydrocarbons. By the use of my particular invention this is prevented and the temperatures are maintained at a sufficiently low temperature to attain the desired results.

By this invention the distillation may be obtained with less expensive apparatus and less first cost than has heretofore been possible, together with greater efficiency in operation and less loss which would arrive where the apparatus must be stopped between heats.

While I have herein described and upon the drawings shown an illustrative embodiment of the invention and a particular method of performing the same, it is to be understood that the invention is not limited to the particular construction, arrangement of parts, and details, shown and described, and steps described, but that it comprehends other constructions, arrangements of parts, details and steps, without departing from the spirit thereof.

Having thus described my invention, I claim:

1. An apparatus for treating a material, comprising a pan of annular shape and for holding material to be treated, means for heating said pan, said pan having an inlet port and an outlet port, and means for moving the material along said pan from said inlet port toward said outlet port.

2. An apparatus for treating a material, comprising an annular pan of channel shape and for supporting material to be heated, means for heating the material on said pan, said pan having an inlet port and an outlet port, and means for moving the material along said pan from said inlet port toward said outlet port.

3. An apparatus for treating a material, comprising a pan of annular shape and adapted to hold the material to be treated, means for heating said pan, said pan having adjacent inlet and outlet ports, and means for moving the material along said pan from said inlet port toward said outlet port.

4. An apparatus for treating a material, comprising a pan of annular and channel form and for supporting material to be heated, means for heating the material on said pan, said pan having adjacent inlet and outlet ports, and means for moving the material along said pan from said inlet port toward said outlet port.

5. An apparatus for treating a material, comprising a pan of annular and channel form and adapted to hold the material to be treated, means for heating said pan, said pan having an inlet port and an outlet port, and means for moving the material along said pan from said inlet port toward said outlet port.

6. An apparatus for treating a material, comprising a pan of annular shape and for holding the material for treatment, means for heating said pan, means for charging said pan with a material, means for discharging said material from said pan, and means for moving the material from said charging means towards said discharging means.

7. An apparatus for treating a material, comprising a pan of annular and channel form for supporting materials to be heated, means for heating the material on said pan, means for charging said pan with a material, means for discharging the material from said pan, and means for moving the material along said pan from said charging means towards said discharging means.

8. An apparatus for treating a material, comprising a pan of annular shape, means for heating said pan, means for charging said pan with a material, means for discharging the material from said pan, the charging and discharging means being adjacent to each other, and means for moving the material along said pan from said charging means towards said discharging means.

9. An apparatus for treating a material, comprising a pan of annular and channel form for supporting material to be heated, means for heating the material on the pan, means for charging the pan with the material, means for discharging the material from said pan, the charging and discharging means being adjacent to each other, and means for moving the material along said pan from said charging means towards said discharging means.

10. An apparatus for treating a material, comprising a pan of annular shape, means for heating the pan to temperatures increasingly higher at successive portions of the annular length of said pan, said pan having an inlet port and an outlet port, and means for moving the material along said pan from said inlet port toward said outlet port.

11. An apparatus for treating a material, comprising a pan of annular shape, means for heating the pan to temperatures increasingly higher at successive portions of the annular length of said pan, means for charging said pan with a material, means for discharging the material from said pan, and means for moving the material along said pan from the charging means toward said discharging means.

12. An apparatus for treating a material, comprising a pan forming an annular channel for supporting materials to be heated, means for heating this material which is disposed on the pan to temperatures increasingly higher at successive positions of the annular length of said pan, said pan having an inlet port and an outlet port, and means for moving the material along said pan from said inlet port toward said outlet port.

13. An apparatus for treating a material, comprising a pan forming an annular channel for supporting material to be heated, means for heating the material disposed on said pan to temperatures increasingly higher at successive positions of the annular length of said pan, means for charging the pan with a material, means for discharging the material from said pan, and means for moving the material along said pan from said charging means toward said discharging means.

14. An apparatus for treating a material, comprising a pan forming an annular channel for supporting material to be treated, means for heating the material disposed on said pan to temperatures increasingly higher at successive positions of the annular length of said pan, means for charging said pan with a material, means for discharging the material from said pan, said charging means and discharging means being adjacent to each other, and means for moving the material along said pan from said charging means towards said discharging means.

15. An apparatus for treating a material, comprising a pan of annular shape, means for heating said pan, said pan having an inlet port and an outlet port, means for moving the material along said pan from said inlet port towards said outlet port, and a member having a reflecting surface located above the material to be heated.

16. An apparatus for treating a material, comprising a pan of annular shape, means for heating said pan, said pan having an inlet port and an outlet port, means for moving the material along said pan from said inlet port towards said outlet port, a member having a reflecting surface located above the material to be heated, and a chamber in said apparatus in communication with the space between the material to be heated and said reflecting surface for receiving gases arising in said space from said material.

17. A material treating device, comprising an annular channel shaped chamber, a cover for the chamber, a movable member extending through a side of the chamber for defining an action space beneath the member and a product space above the member, and sealing means between said member and said cover and said side of said chamber.

18. A material treating device, comprising spaced annular walls of different heights, a pan between said walls and adapted for holding the material to be treated, means for heating the pan, a cover on the higher of said walls, a member extending over the lower of said walls and over the pan to provide spaces between the member and the pan and the cover, and sealing means between the member and said lower wall and said cover.

19. A material treating device, comprising spaced annular walls of different heights, a pan between said walls and adapted for holding the material to be treated, means for heating the pan, a cover on the higher of said walls, a movable member having a rim portion thereof extending over the lower of said walls and over the pan to provide spaces between the member and the pan and the cover and movable over the pan lengthwise thereof, and sealing means between the member and said lower wall and said cover.

20. A material treating device, comprising an annular channel shaped pan for holding the material to be treated and having adjacently located inlet and outlet ports, charging means at said inlet port, discharge means at said outlet port, heating means having a duct under said pan for conducting heating medium along the under side of the pan in a direction from said outlet port toward said inlet port, and means for moving the material on said pan in a direction opposite to the movement of the heating medium.

In witness whereof, I hereunto subscribe my name to this specification.

HENRY G. LYKKEN.